United States Patent [19]

Kato

[11] 3,758,120

[45] Sept. 11, 1973

[54] SPIRAL TRACK MAGNETIC RECORDING AND REPRODUCING APPARATUS

[75] Inventor: Saburo Kato, Tokyo, Japan

[73] Assignee: Ricoh Co., Ltd., Tokyo, Japan

[22] Filed: Apr. 13, 1970

[21] Appl. No.: 27,694

[30] Foreign Application Priority Data

Apr. 15, 1969 Japan .............................. 44/29208

[52] U.S. Cl. ................................................ 274/4 J

[51] Int. Cl. ............................................ G11b 5/80

[58] Field of Search ..................... 35/35 C; 274/4 H, 274/4 J, 9 C; 179/100.2 T, 100.4 ST, 100.41 K; 178/6.6 A

[56] References Cited

UNITED STATES PATENTS

| | | | |
|---|---|---|---|
| 1,787,919 | 1/1931 | Watson | 178/6.6 A |
| 1,834,886 | 12/1931 | Barton | 179/100.4 ST |
| 2,033,648 | 3/1936 | Ranger | 179/100.41 K |
| 865,344 | 9/1907 | Moore | 179/100.41 K |
| 3,046,357 | 7/1962 | Fujimoto | 274/4 J |
| 3,503,057 | 3/1970 | Logan | 179/100.2 T |
| 3,424,872 | 1/1969 | Whitlock | 35/35 C |
| 3,322,427 | 5/1967 | Fujimoto | 179/100.2 T |
| 3,331,144 | 7/1967 | Hahn | 35/35 C |

*Primary Examiner*—Harry N. Haroian
*Attorney*—Henry T. Burke, Robert Scobey, Robert S. Dunham, P. E. Henninger, Lester W. Clark, Gerald W. Griffin, Thomas F. Moran, R. Bradlee Boal, Christopher C. Dunham and Ivan S. Kavrukov

[57] ABSTRACT

Spiral track magnetic recording and reproducing method and apparatus employing a pair of magnetic heads for simultaneous recording or playback by both, or for recording by one head while either recording or playing back by the other head. The two heads are movably disposed on a turntable in diametrically spaced apart relation and move radially inwardly and outwardly respectively along spiral tracks of a stationary magnetic sheet. Means are provided: for automatically stopping the heads when one approaches the other's track and for returning them to initial positions; for permitting one of the heads to move from its initial position to the initial position of the other head; and for manually moving the heads to desired radial positions.

4 Claims, 6 Drawing Figures

INVENTOR.
SABURO KATO

INVENTOR.
SABURO KATO

INVENTOR.
SABURO KATO

SPIRAL TRACK MAGNETIC RECORDING AND REPRODUCING APPARATUS

BACKGROUND OF THE INVENTION

The present invention relates generally to magnetic recording and reproducing methods and apparatus and relates more particularly to spiral track magnetic recording and reproducing methods and apparatus. More specifically, the invention relates to a spiral track magnetic recording and reproducing method and apparatus employing a pair of heads. Both heads can record simultaneously, both can play back simultaneously, or one can record while the other one is playing back.

A magnetic recording and reproducing apparatus employing inexpensive, easy-to-handle magnetic sheet as the recording medium is known in the art. Generally a turntable cooperates with a stationary magnetic sheet and carries recording-playback heads such that upon rotation of the turntable the heads move along the continuous spiral tracks of the magnetic sheet like an arm of a phonograph. The apparatus is particularly suitable for use as a teaching machine (as for language teaching) because it is simple both in construction and operation, and is inexpensive. However, it has been long desired to provide, especially for foreign language training, an apparatus of this type which can record or play back two different tracks simultaneously, or which can record on one track while playing back the prerecorded other track, like certain stereophonic tape recorders, so that a student can record his voice while listening to the prerecorded voice of a teacher.

SUMMARY OF THE INVENTION

A spiral track magnetic recording and reproducing method and apparatus involving the use of: a turntable rotating with respect to a stationary magnetic sheet, a pair of magnetic heads movably disposed on the turntable in diametrically spaced relationship with each other, head feed means for feeding said pair of heads radially inwardly or outwardly such that each of the heads moves along a continuous spiral track of the magnetic sheet while the turntable is rotating, whereby both of the heads may simultaneously record in, or may simultaneously play back from their independent spiral tracks, or one of the heads may play back while the other one is recording.

It is the primary object of the invention to provide a spiral track magnetic recording and reproducing method and apparatus employing a magnetic sheet and having a pair of heads for simultaneous recording by both, or simultaneous playback by both, or for recording by one head and simultaneous playback by the other head.

It is another object of the present invention to provide a spiral track magnetic recording and reproducing apparatus suited as a teaching machine, especially for foreign language training. It is a further object of the present invention to provide a spiral magnetic recording and reproducing apparatus which is simple in construction, reliable and simple in operation, and inexpensive to manufacture.

It is a further object of the present invention to provide a spiral track magnetic recording and reproducing apparatus in which the pair of heads may be stopped when they approach the other's track and returned automatically to their initial positions.

It is a further object of the present invention to provide a spiral track magnetic recording and reproducing apparatus in which the heads may be moved along the spiral tracks from the initial position of one of the heads to the initial position of the other, so that one of the heads may be used for recording or playback over the entire available spiral track of a magnetic sheet when simultaneous recording or playback by the other head is not required.

It is a further object of the present invention to provide a spiral track recording and reproducing apparatus in which the heads may be arbitarily moved manually to desired positions along the spiral tracks for recording or playback.

According to one aspect of the invention, means is provided for stopping the spiral movement of the heads when one approaches the other's track by a predetermined distance in the radial direction of the turntable and for returning the heads to their initial positions.

According to another aspect of the invention, means is provided for de-activating the head stopping and returning means and permitting the head feed means to feed either of the heads to the initial position of the other head, so that either of the heads may either record or play both tracks.

According to a further aspect of the invention means is provided for disengaging the heads from the head feed means for radially moving the heads to desired positions of the spiral tracks of the magnetic sheet.

According to the present invention, one of the heads may be primarily used for playback while the other is used for both recording and playback so that a student may listen to the played-back voices of a teacher, and record his voice, and then may play back his recording together with that of the teacher for comparison.

DESCRIPTION OF THE PREFERRED EMBODIMENT

Figure 1:
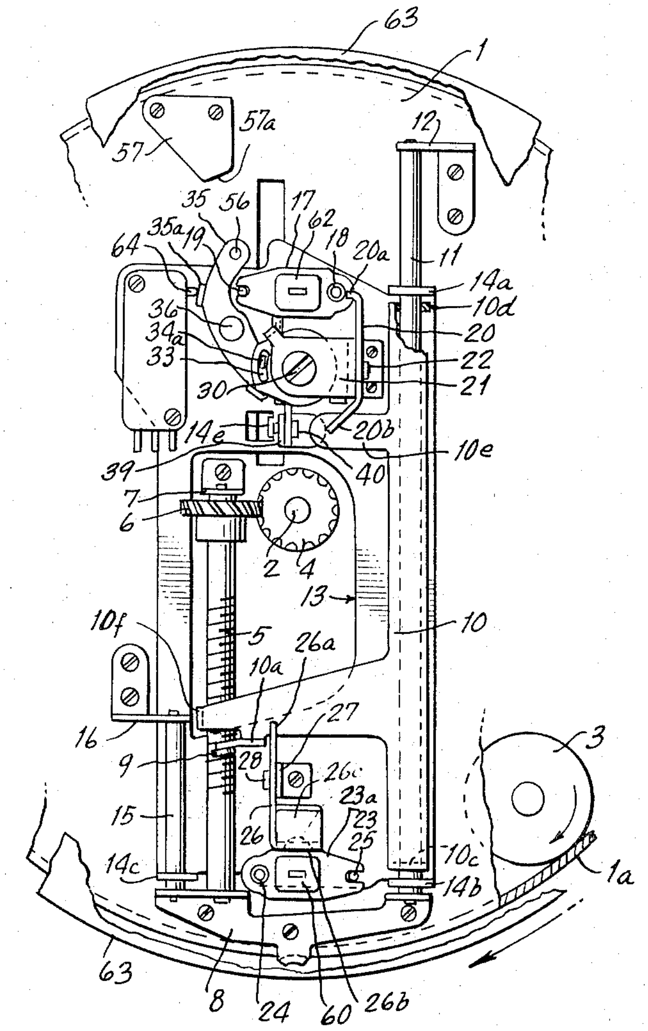
FIG. 1 is a partial plan view of one embodiment of the invention illustrating principal components thereof.

Referring to FIG. 1, a turntable 1 is rotatably carried by a fixed spindle 2 which in turn is fixed to a chassis (not shown) of a magnetic recording-reproducing apparatus. A friction drive roller 3, rotating in the direction indicated in the drawing, is driven by a motor (not shown) and is in contact with the inner rim 1a of the turntable 1 so as to rotate it in the same direction.

A helical gear 4 carried by the spindle 2 at the top thereof is in mesh at a right angle with a helical gear 6 carried by a head feed threaded rod 5 which in turn is rotatably journalled by a pair of bearing members 7 and 8 which are fixed to the turntable 1 and are spaced from each other. A frusto-conical roller 9 carried by an arm 10a extending from an interlocking member 10 is in engagement with the screw threads of the head feed rod 5. When the turntable 1 is rotating about the spindle 2, the helical gear 6 rotates around the stationary helical gear 4 so that the threaded rod 5 is caused to rotate and to thereby cause the roller 9 to move radially inwardly along the screw threads of the head feed rod 5.

The arm 10*a* carrying the roller 9 is integral with a laterally extending arm 10*b* of the interlocking member 10 whose ears 10*c* and 10*d* formed at both ends thereof are loosely fitted over a relatively long guide rod 11 disposed in parallel with the threaded rod 5 so that the interlocking member 10 may be rotatable about the guide rod 11.

The interlocking member 10 also has another arm 10*e* laterally extending in the same direction as the arm 10*b*.

The guide rod 11 is journalled by the bearing member 8 and a bearing member 12. Both bearing members are fixed to the turntable 1.

A sliding plate 14 with a relatively wide opening 13 has ears 14*a* and 14*b* which are at opposite corners of the plate and are loosely fitted over the guide rod 11. An ear 14*c* is at a third corner of the plate 14 and is loosely fitted over a shorter guide rod 15 such that the plate 14 may slide in the axial direction of the threaded rod 5. The ears 10*d* and 10*c* of the interlocking member 10 are interposed between the ears 14*a* and 14*b* of the sliding plate 14 so as to prevent play between the sliding plate 14 and the interlocking member 10 in the axial direction of the guide rod 5. The shorter guide rod 15 is supported by the bearing member 8 and an arm or bracket 16 fixed to the turntable 1.

An outer head 60 and an inner head 62 are vertically movably fixed to the sliding plate 14. The inner head 62 is carried by a head supporting plate 17 whose hole and notch are loosely fitted over a stud 18 and a pin 19 respectively and which is normally biased by means of an expansion spring (not shown) so as to be normally away from the sliding plate 14. A lever 20 (refer to both FIGS. 1*a* and 5) for connecting the supporting plate 17 to the arm 10e of the interlocking member 10 is pivotably fixed by a pin 22 to a vertical portion of a crankshaped supporting member 21. The supporting plate 17 is pressed against the lower side of the bent portion 20*a* at one end of the lever 20 while the arm 10*e* is pressed against the other end 20*b* of the lever 20. The rotation of the interlocking member 10 due to the contact of the arm 10*e* thereof with the lever 20 is limited when the depending portion 10f (See FIG. 5) contacts with the upper surface of the turntable 1.

Figure 5:
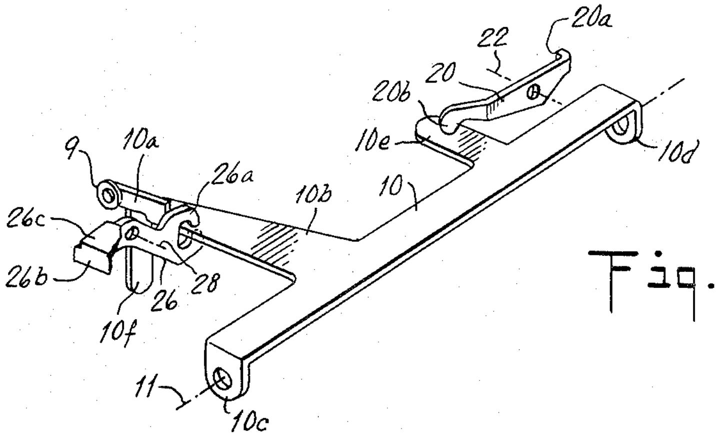
FIG. 5 is a perspective view of a mechanism for drivingly interlocking a pair of heads.

The outer head 60 is supported by a supporting plate 23, a stud 24 and a pin 25 in a similar manner as the inner head 62 (refer to both FIGS. 1 and 5). An operating lever 26 connecting the supporting plate 23 to the arm 10*b* of the interlocking member 10 is pivotably fixed by a pin 28 to an L-shaped member 27 fixed to the turntable 1. The end 26*a* of the lever 26 is bifurcated (as best shown in FIG. 5) so as to loosely clamp the arm 10*b*. A projection 23*a* of the head supporting plate 23 is pressed against the lower side edge of the bent portion 26*b* of the lever 26. The supporting plate 23 is also biased by means of a spring (not shown) so as to normally move upwardly of the sliding plate 14.

When the finger stop 26*c* of the operating lever 26 is pushed down so as to rotate the lever 26 about the pin 28, the supporting plate 23 is pushed downwardly by the bent portion 26*b* while the arm 10*b* of the interlocking member 10 is pushed upwardly; that is, the interlocking member 10 is rotated about the guide rod 11 so that the roller 9 is disengaged from the threaded rod 5. At the same time, the arm 10*e* raises the end 20*b* of the lever 20 so as to rotate it about the pin 22 so that the supporting plate 17 is pushed downwardly by the end 20*a* of the lever 20. Since the roller 9 may be disengaged from the threaded rod 5 as described hereinabove by actuating the operating lever 26, both of the heads 60 and 62 may be displaced radially to any position by pushing the finger stop 26*c*. It should be noted both heads 60 and 62 are moved away from the surface of a magnetic sheet to prevent contact therewith during radial movement while the lever 26 is down.

Figure 2:
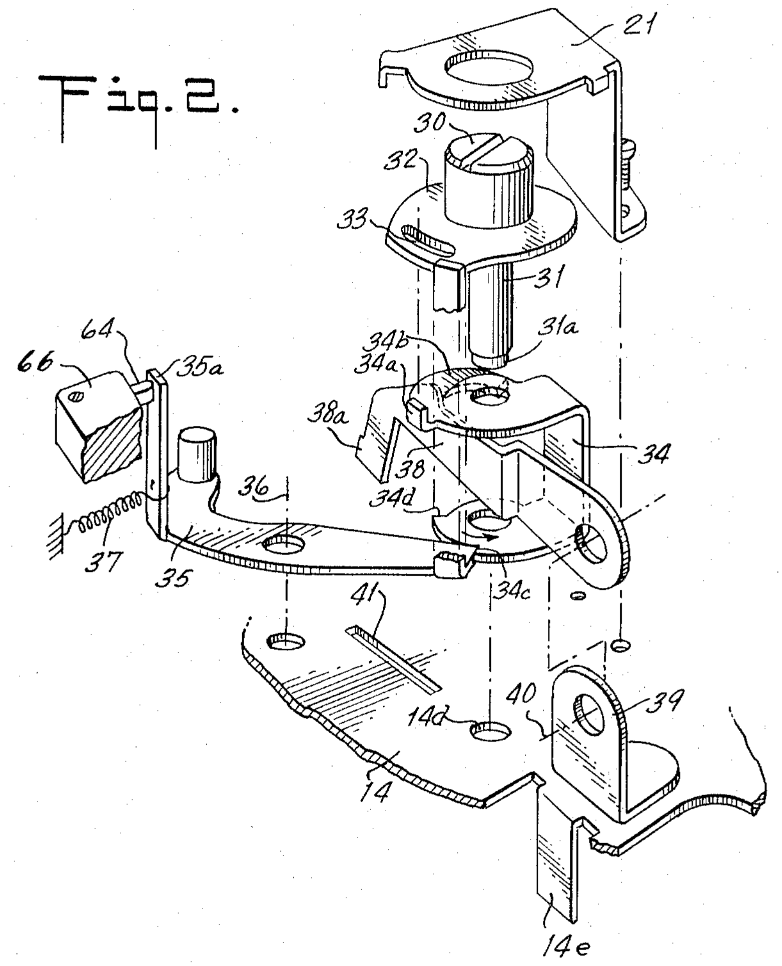
FIG. 2 is an exploded perspective view of a switching mechanism employed in the invention.

An operating shaft 31 having a slit 30 formed at the top end is rotatably fixed to the L-shaped retaining member 21 adjacent to the inner head 62. The reduced diameter portion 31*a* of the operating shaft 31 (See FIG. 2) is loosely fitted into a hole 14*d* formed through the sliding plate 14. A cam plate 32 carried by the operating shaft 31 has an arcuate slot 33 whose center of curvature coincides with the axis of the shaft 31 and a projection 34*a* extending from the side edge of an engaging member 34 is loosely fitted into the this arcuated slot 33.

The engaging member 34 is generally U-shaped and is rotatably carried by the operating shaft 31. The member 34 has a cam arm 34*b*, a first engaging stepped portion 34*c*, and a second engaging stepped portion 34*d*. The member 34 is normally biased in the clockwise direction in FIG. 1 by a spring (not shown), but its clockwise rotation is limited when the first stepped portion 34*c* engages with a switch actuating lever 35. The switch actuating lever 35 is pivotably fixed to the sliding plate 14 by a pin 36 and is normally biased in the counterclockwise direction in FIG. 1 by a spring 37.

Figure 4:
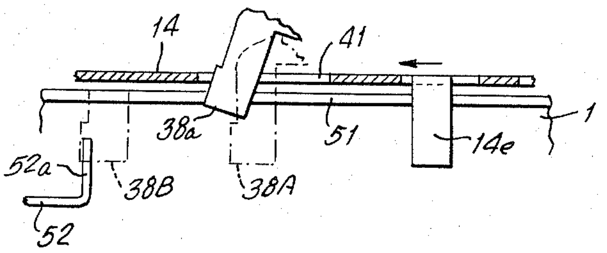
FIG. 4 is a partial sectional view of a mechanism for returning a pair of heads to their initial positions.

An engaging member or cam follower 38 which is pivotably fixed by a pin 40 to an L-shaped member 39 fixed to the sliding plate 14 is pressed against the cam arm portion 34*b* of the engaging member 34. The leading end 38*a* of the engaging member or cam follower 38 is loosely fitted into a slit 41 of the sliding plate 14 and a hole 51 of the turntable 1 as shown in FIG. 4. The rotation of the engaging member 34 by the spring described above is also limited when the cam plate 32 engages with a stopper 21*a* of the supporting plate 21.

When the cam plate 32 is rotated in the counterclockwise direction in FIG. 1, as by inserting a coin or screwdriver into the slit 30 of the operating shaft 31, the projection 34*a* is also rotated because one end of the arcuate slot 33 pushes the projection 34*a*. The engaging member 34 is caused to rotate in the same direction as the cam plate 32, whereby the leading end of the switch actuating lever 35 engages with the second stepped portion 34*d*. Thus, the switch actuating lever 35 is rotated by the spring 37 about the pin 36 so that its projection 35*a* depresses an actuating element 64 of a micro-switch 66 thereby closing or activating an electric circuit including the inner head 62. Upon rotation of the engaging member 34, the cam portion 34*b* pushes down the engaging member or cam follower 38 so that its leading end 38*a* is extended downwardly beyond the turntable 1 as indicated by the broken lines 38A in FIG. 4.

When the turntable 1 makes one rotation while the leading end 38*a* remains extended downwardly beyond the turntable 1, the sliding plate 14 is displaced to the left in FIG. 4 so that the leading end 38*a* engages with the upright portion 52*a* of a head returning member 52 as shown by the broken lines 38B in FIG. 4, thereby actuating a head returning mechanism drivingly interconnected with the head returning member 52. The returning member 52 which is pivotably fixed to the chassis of the apparatus and the head returning mechanism are not described in further detail since they do not form a part of the present invention.

When the engaging member or cam follower 38 is not under the action of the cam arm portion 34*b* so that the leading end 38*a* is in its upper position while the sliding plate 14 is displaced to the left in FIG. 4 in response to the rotation of the turntable 1, the leading end 38*a* passes over the returning member 52 and then the depending portion 14*e* extending from the sliding plate 14 engages with the returning member 52.

Return of the sliding plate 14 is initiated when the leading end 38*a* or the depending portion 14*e* engages with the returning member 52, which in turn generates a signal to the head returning mechanism.

Figure 6:
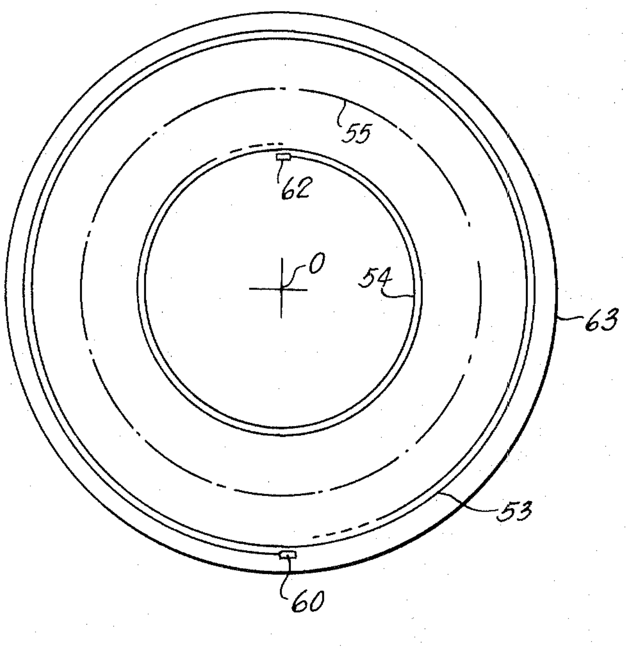
FIG. 6 is a diagrammatic view showing spiral magnetic recording tracks in a magnetic sheet used in the present invention.

Referring to FIG. 6, reference numeral 53 designates a magnetic recording track for the outer head 60; the reference numeral 54 designates a magnetic recording track for the inner head 62; and the reference numeral 55 designates an imaginary line dividing the tracks 53 and 54. When the turntable 1 rotates in the clockwise direction, the outer head 60 makes a spiral movement radially inwardly from the initial position in which it is shown toward the center of the turntable, while the inner head 62 makes a similar spiral movement but radially outwardly. When the operating shaft 31 is switched to cause the leading end 38*a* to engage with the returning member 52, the leading end 38*a* strikes the returning member 52 when both of the outer and inner heads 60 and 62 approaches the imaginary line 55, whereby the heads 60 and 62 are returned to their initial positions respectively. Thereafter, the turntable 1 is stopped.

For example, the voice of a teacher may be recorded on the outer track 53 and reproduced by the outer head 60 while a student listens to it and then imitates it by recording on the inner track 54. It is preferable to have pauses in the teacher's voice recording in order to allow recording the student's imitation during these pauses, such that later the two tracks 53 and 54 can be played back simultaneously.

The teacher's voice may be on the inner track; however, it is preferable to record it in the outer track because the fidelity of reproduction is better since the speed of the outer head 60 relative to the outer track 53 is higher than the speed of the inner head 62 relative to the inner track 54.

Figure 3:
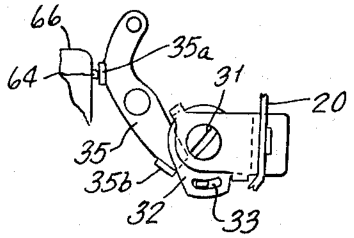
FIG. 3 is a larger scale view of a part of FIG. 1.

To return the cam plate 32 from the position shown in FIG. 3 to the position of FIG. 1, the operating shaft 31 may be rotated in the clockwise direction. In this case, the cam plate 32 rotates through an angle until the projection 34*a* moves relative to the cam plate 32 through the arcuate slot 33*a* and engages with the other end thereof, thereby moving the upright portion 35*a* of the switch actuating lever 35 away from the micro-switch 66 and disengaging the switch actuating lever 35 from the second stepped portion 34*d* (See FIG. 2) of the engaging member 34. Thereafter the engaging member 34 may be returned to the position in FIG. 1 either by a spring (not shown) or manually.

The engaging member 34 rotates and stops when the switch actuating lever 35 engages with the first stepped portion 34*c*. The engaging member or cam follower 38 is displaced by a spring (not shown) according to the profile of the cam portion 34*b* so that the leading end 38*a* is moved upwardly as shown in solid lines in FIG. 4. When the apparatus is in this state, the heads may be displaced until the depending portion 14*e* (See FIG. 4) engages with the returning member 52 as described hereinabove. Thus, either the outer head or the inner head may be used for recording over both of the outer and inner tracks of an unrecorded sheet or for reproduction. It is therefore seen that the apparatus of the present invention may be used in a similar manner as in the case of the conventional recording and reproducing apparatus using spiral track recording sheets by switching the operating shaft 31 from one position to another.

When the sliding plate 14 is manually moved upwardly in FIG. 1 while the switch actuating lever 35 remains in actuating position as shown in FIG. 3, a pin 56 extending from the lever 35 engages with a sloping edge 57*a* of a cam 57 fixed to the turntable 1 so that the pin 56 is displaced toward the right in FIG. 1. Consequently, the switch actuating lever 35 is caused to rotate in the clockwise direction so that it disengages from the second stepped portion 34*d* of the engaging member 34, thereby returning the engaging member 34 and opening the micro-switch 66.

As means for automatically stopping the recording or reproduction, as for example when the inner head 62 approaches the outer recording track 53, the engaging member or cam follower 38 prevents accidental crossing of the dividing line 55. However, other suitable means, such as in conventional apparatus of this type, may be employed.

I claim:

1. A spiral track magnetic recording and reproducing apparatus comprising a. a turntable;

b. a pair of magnetic heads;

c. a recording medium in the form of a magnetic sheet disposed parallel to said turntable;

d. means for establishing relative rotational motion between said turntable and said recording medium while maintaining their parallel relationship;

e. means supported by the turntable for positioning said magnetic heads in operational proximity to the recording medium to allow recording or playback;

f. head feed means for feeding one of the magnetic heads radially inwardly while feeding the other magnetic head radially outwardly with respect to the turntable while maintaining their operational proximity to the recording medium, thereby moving each of the heads along a separate continuous spiral track of the recording medium;

g. means for positioning the magnetic heads at initial positions radially spaced from each other;

h. means for stopping the spiral movement of the magnetic heads with respect to the recording medium when one head moves to within a predetermined distance of a spiral track reserved for the other head; and i. means for selectively deactivating said head stopping means and for permitting said head feeding means to feed each head from its initial position to the initial position of the other head with respect to distance from the center of the spiral tracks, thereby allowing one of the heads to traverse the spiral track of the other head as well as its own spiral track.

2. Apparatus for moving two electromagnetic transducer heads simultaneously in opposite directions along a continuous spiral path, comprising:

a. a pair of electromagnetic transducer heads;

b. an annular table;

c. a shaft extending axially of the table, said shaft and table being relatively rotatable, said spiral path being fixed with respect to said shaft;

d. a frame extending diametrically of the table and spanning the shaft, said frame supporting said heads on opposite sides of said shaft and spaced apart by a distance greater than the maximum radius of the spiral path; and e. drive means for moving the frame diametrically of the table concurrently with relative rotation of the table and shaft, so that the heads simultaneously move in opposite directions along separate portions of said spiral path, one of said path portions being disposed radially inwardly of the other with respect to the center of said path so that said path portions respectively constitute distinct radial segments of the path, said drive means being capable of moving said frame so as to move at least one of said heads beyond its respective portion of the path and along the other of said portions of the path; and f. selecting means for selectively permitting and preventing movement of said frame to effect movement of said one head beyond its respective portion of the path and along the other of said portions of the path.

3. Magnetic recording and reproducing apparatus comprising a. a rotatably driven turntable;

b. a pair of magnetic heads respectively disposed on opposite sides of the axis of rotation of said turntable;

c. means for supporting said heads on said turntable for rotation therewith in simultaneous operative contact with a fixedly positioned magnetic recording sheet;

d. means for moving said heads radially of said turntable during rotation of the turntable so that each of said heads advances along a continuous spiral path in contact with a sheet as aforesaid, said last-mentioned means including means for limiting the extent of radial movement of said heads so that the spiral paths of the respective heads are restricted to discrete portions of the magnetic sheet, said head-moving means comprising means for simultaneously moving both heads while maintaining the heads fixed in relation to each other, and one of said heads moving radially inwardly and the other moving radially outwardly with respect to said turntable during simultaneous movement of the heads;

e. said movement-limiting means comprising means for arresting radial motion of the heads at a point at which one of the heads has moved not more than half the radial distance between initial positions of the two heads respectively located adjacent the center and adjacent the periphery of the turntable; and f. said movement-limiting means being adjustable to permit continuous motion of said one head across the full radial distance between said initial positions.

4. A spiral track magnetic recording and reproducing apparatus including a turntable, a pair of magnetic heads, and a recording medium in the form of a magnetic sheet disposed parallel to said turntable, comprising:

a. means for establishing relative rotational motion between said turntable and said recording medium while maintaining their parallel relationship;

b. means supported by the turntable for positioning said magnetic heads in operational proximity to the recording medium to allow recording or playback with said heads disposed on opposite sides of the center of said turntable along a straight line which passes through the center of the turntable;

c. head feed means for feeding the magnetic heads radially with respect to the turntable while maintaining their operational proximity to the recording medium, thereby moving the heads respectively along separate portions of a continuous spiral track of the recording medium, one of said track portions being disposed radially inwardly of the other with respect to the center of said track so that said track portions respectively constitute distinct radial segments of the track, said head feed means being capable of moving at least one of said heads beyond its respective portion of the track and along the other of said portions of the track ; and d. selecting means for selectively permitting and preventing movement of said one of said heads beyond its respective portion of the track and along the other of said portions of the track as aforesaid, said selecting means including means for rendering the other of said heads inoperative for recording and reproducing when said one head is permitted to move along both of the track portions.

* * * * *